(12) United States Patent
Langer

(10) Patent No.: US 6,427,527 B1
(45) Date of Patent: Aug. 6, 2002

(54) DIAGNOSTIC METHOD OF DETERMINING CAUSES OF FAULTS IN THE FORMATION OF AN AIR/FUEL MIXTURE FOR AN INTERNAL COMBUSTION ENGINE

(75) Inventor: Winfried Langer, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 09/676,565

(22) Filed: Oct. 2, 2000

(30) Foreign Application Priority Data

Sep. 30, 1999 (DE) .......................................... 199 46 874

(51) Int. Cl.$^7$ ............................................. G01M 15/00
(52) U.S. Cl. ....................................................... 73/118.1
(58) Field of Search ................................ 73/116, 117.2, 73/117.3, 118.1; 701/101, 102, 103, 104

(56) References Cited

U.S. PATENT DOCUMENTS 4,794,790 A    1/1989   Margarit-Metaxa et al.

OTHER PUBLICATIONS

"Automotive Handbook", Fourth Edition (1996), pp. 480 to 481.

Primary Examiner—Eric S. McCall
(74) Attorney, Agent, or Firm—Walter Ottesen

(57) ABSTRACT

The invention is directed to a method for determining causes of faults in the formation of the air/fuel mixture for an internal combustion engine. First, different operating parameters of the engine are detected and at least three load signals are formed on the basis of at least somewhat different operating parameters. The three load signals represent respective air quantities which flow into the engine. Different pairs of two load signals in each pair are formed and deviations of the each two load signals of a pair with respect to each other are determined for different pairs. Different causes are allocated to different combinations of pairs wherein deviations were determined.

9 Claims, 4 Drawing Sheets

DIAGNOSTIC METHOD OF DETERMINING CAUSES OF FAULTS IN THE FORMATION OF AN AIR/FUEL MIXTURE FOR AN INTERNAL COMBUSTION ENGINE

BACKGROUND OF THE INVENTION

Known diagnostic methods provide a check of individual sensors or actuators or their operating chains. U.S. Pat. No. 4,794,790 describes a diagnostic method for a tank-venting valve wherein an idle actuator operates to close at the same time as the tank-venting valve opens. The effects of the drives of both actuators should cancel each other in a trouble-free state of operation.

It is known to measure the temperature increase in the intake manifold when there is an active exhaust-gas recirculation for diagnosing the latter.

Furthermore, it is known from the "Automotive Handbook", Fourth Edition (1996) published by the Society of Automotive Engineers to provide an integrated diagnosis for engine control apparatus wherein, inter alia, a substitute signal is formed from engine rpm and throttle flap angle when there is a fault of the load sensor (air mass, air quantity, intake manifold pressure).

SUMMARY OF THE INVENTION

It is an object of the invention to provide an improvement of the self diagnosis of engine control systems and especially engine control systems for internal combustion engines having variable exhaust gas recirculation.

According to the invention, a determination of the cause for a fault in the formation of the air/fuel mixture for an internal combustion engine includes the following steps: detecting different operating parameters of the engine; forming at least three load signals, which represent the respective air quantities flowing into the engine, on the basis of at least partially different operating parameters; forming different pairs of two load signals each; determining the deviations of each of the two signals of one pair with respect to each other for different pairs; attributing various causes to different combinations of pairs wherein deviations have been determined within the pairs.

In one embodiment, at least three of the following quantities are detected as operating parameters:

(a) signal of an air-mass sensor;

(b) signal of an rpm transducer;

(c) signal of an intake manifold pressure sensor;

(d) signal of an exhaust-gas probe;

(e) signal of a fuel pressure sensor.

In connection with the above, the following signals can be formed:

(a) a first load signal rl_hfm on the basis of the signal of the air-mass sensor;

(b) a second load signal rl_ps on the basis of an intake manifold pressure transducer and an rpm transducer; and, (c) a third load signal rl_rk on the basis of the following: the injection time, the signal of a fuel pressure sensor; and, an exhaust-gas probe signal.

Furthermore, the following pairs of two load signals each are formed:

(a) a first pair from first and second load signals;

(b) a second pair from first and third load signals; and, (c) a third pair from second and third load signals.

A defective tank-venting valve is deemed to be the fault cause when there are deviations in each pair of a combination of first, second and third pairs.

A defective intake manifold sensor or a defective exhaust-gas recirculation valve or a clogged air filter are deemed to be the fault cause when there are deviations in the first and in the third pairs of a combination of first, second and third pairs.

Deviations in the first and second pairs of a combination of first, second and third pairs are attributed to a defective air-mass sensor or a leak in the exhaust-gas module.

Deviations in the second and in the third pairs of a combination of first, second and third pairs are attributed to a defective fuel pressure sensor.

To distinguish a defective intake manifold pressure sensor from a defective exhaust-gas recirculation valve or a clogged air filter, supplementary, a first value can be stored for the pressure forward of the throttle flap from the following: the intake manifold pressure (rearward of the throttle flap), the throttle flap angle and the rpm during the operation of the engine; and, a second value for the intake manifold pressure at standstill (corresponding to the pressure forward of the throttle flap) of the engine can be detected and can be compared to the first value.

When both intake manifold pressure values are the same, the intake manifold pressure sensor can be indicated as being defective and when the first value is exceeded by the second value, the air filter can be indicated as being clogged; and, when the second value drops below the first value, the exhaust-gas recirculation valve can be indicated as being defective.

The advantages of the invention are that the invention permits faults to be distinguished of the following: the air-mass sensor; the intake manifold pressure sensor; the exhaust-gas recirculation valve; the tank venting; the fuel pressure sensor as well as the detection of leakage air in the intake manifold or of a clogged air filter.

A special advantage of the invention is that the cause of a defective mixture formation can be determined with relatively simple functions.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
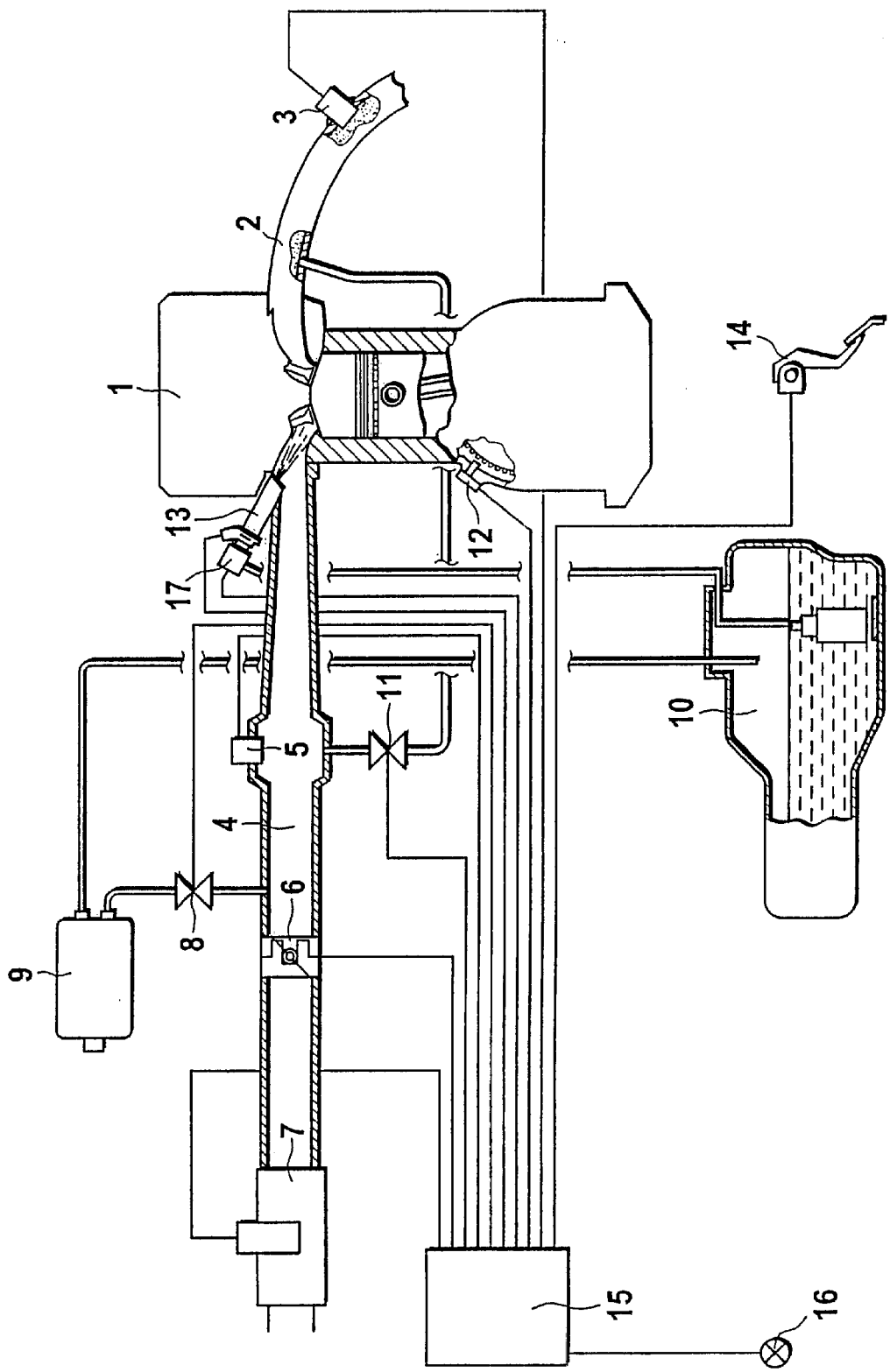
FIG. 1 shows the technical background for the diagnostic method of the invention; and, FIGS. 2A to 2C show an embodiment of the method of the invention in the context of a flowchart.

FIG. 1 shows the following: an internal combustion engine 1, an exhaust-gas pipe 2, an exhaust-gas probe 3, an intake manifold 4, an intake manifold pressure sensor 5, an electrically adjustable throttle flap 6, an air-mass sensor 7, a tank-venting valve 8, an active-charcoal container 9, a fuel tank 10, an exhaust-gas recirculation valve 11, an rpm sensor 12, a fuel injection valve 13, an accelerator pedal module 14, a fuel pressure sensor 17 and a control apparatus 15. Reference numeral 16 identifies a means for indicating and/or storing diagnostic results, for example, a fault lamp or a memory cell for storing a detailed fault code.

The air-mass sensor 7, for example, a hot-film air-mass sensor hfm directly measures the air mass ml which flows into the intake manifold. For this purpose, the air-mass flow dm/dt, which is averaged over an intake stroke, is multiplied by the intake stroke time. In the steady state condition, this corresponds directly to the air charge of the inducting cylinder if no further inflows occur between the air-mass sensor and the cylinder. Further inflows are possible from a tank-venting valve and/or an exhaust-gas recirculation valve and/or a leak in the intake manifold. The load signal obtained from the signal of the hot-film air-mass sensor is identified in the following as rl–hfm.

The intake manifold pressure sensor measures the total pressure p-intake of the gas in the intake manifold. A linear relationship exists between p-intake and the gas charge of the cylinders. The fresh air component, which is relevant for fuel metering, is dependent on this gas charge and is especially also dependent on whether inflows of exhaust gas occur via the exhaust-gas recirculation. The load signal, which is obtained from the signal of an intake manifold pressure sensor, is identified in the following as rl–ps.

The air charge can be determined to a certain extent in reverse from the injected fuel mass rk and a signal lambda as to the oxygen concentration in the exhaust gas.

The fuel mass rk is dependent upon the geometry of the injection valve, the fuel pressure and the valve opening time. The geometry (for example, the throughflow cross section in the open state) is fixedly given by the construction. The valve opening time is present in the control apparatus and the fuel pressure is present as a measurement quantity. The oxygen concentration in the exhaust gas is likewise present as a measurement quantity $\lambda$ and determines the proportionality factor between air charge rl of the cylinder and the fuel mass rk which is measured for this cylinder. For $\lambda=1$, the proportionality factor is known to be 14.7 (rl=14.7*rk). The fuel signal, which is computed from the fuel mass, is identified in the following as rl–rk.

Figure 2A:
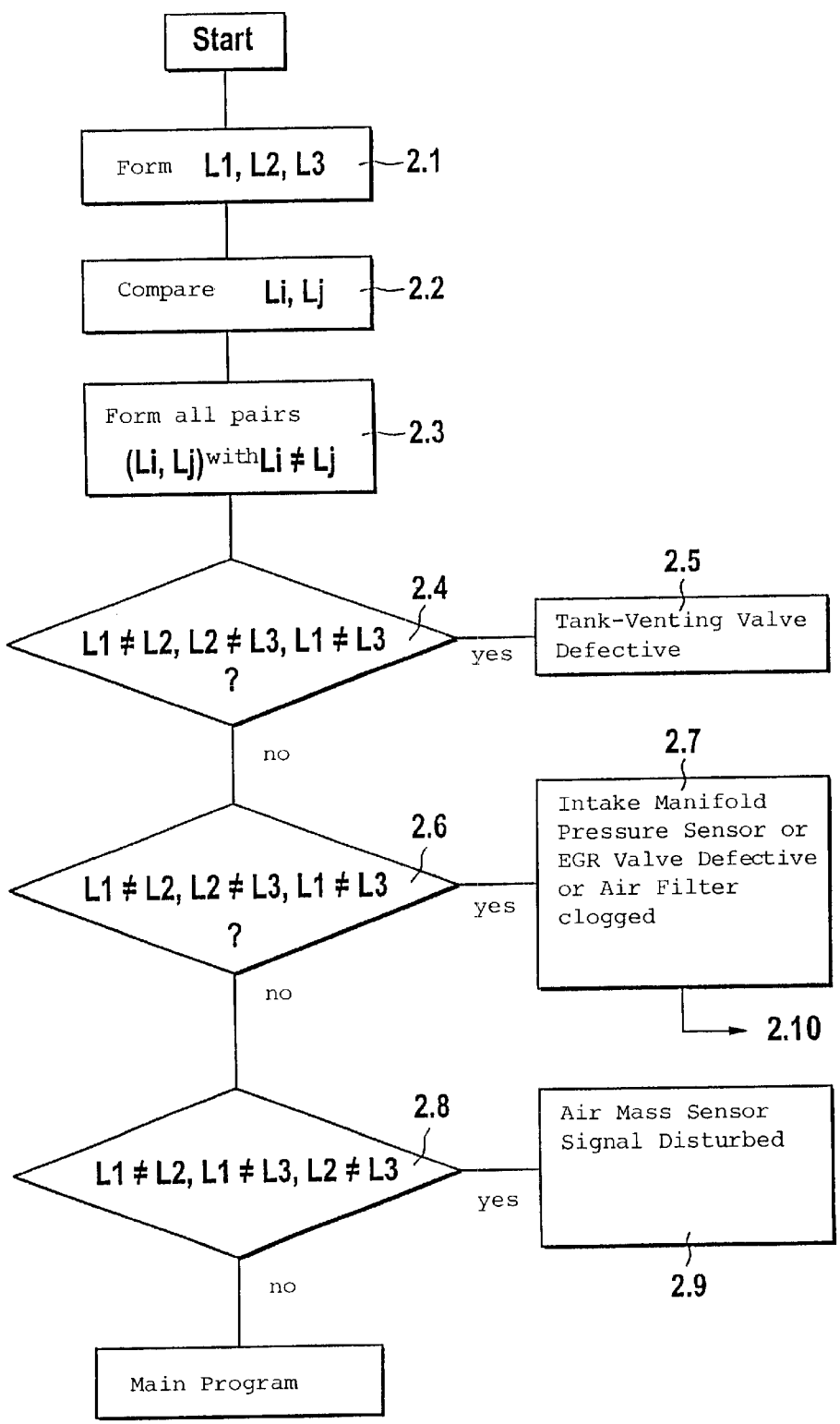
Figure 2B:
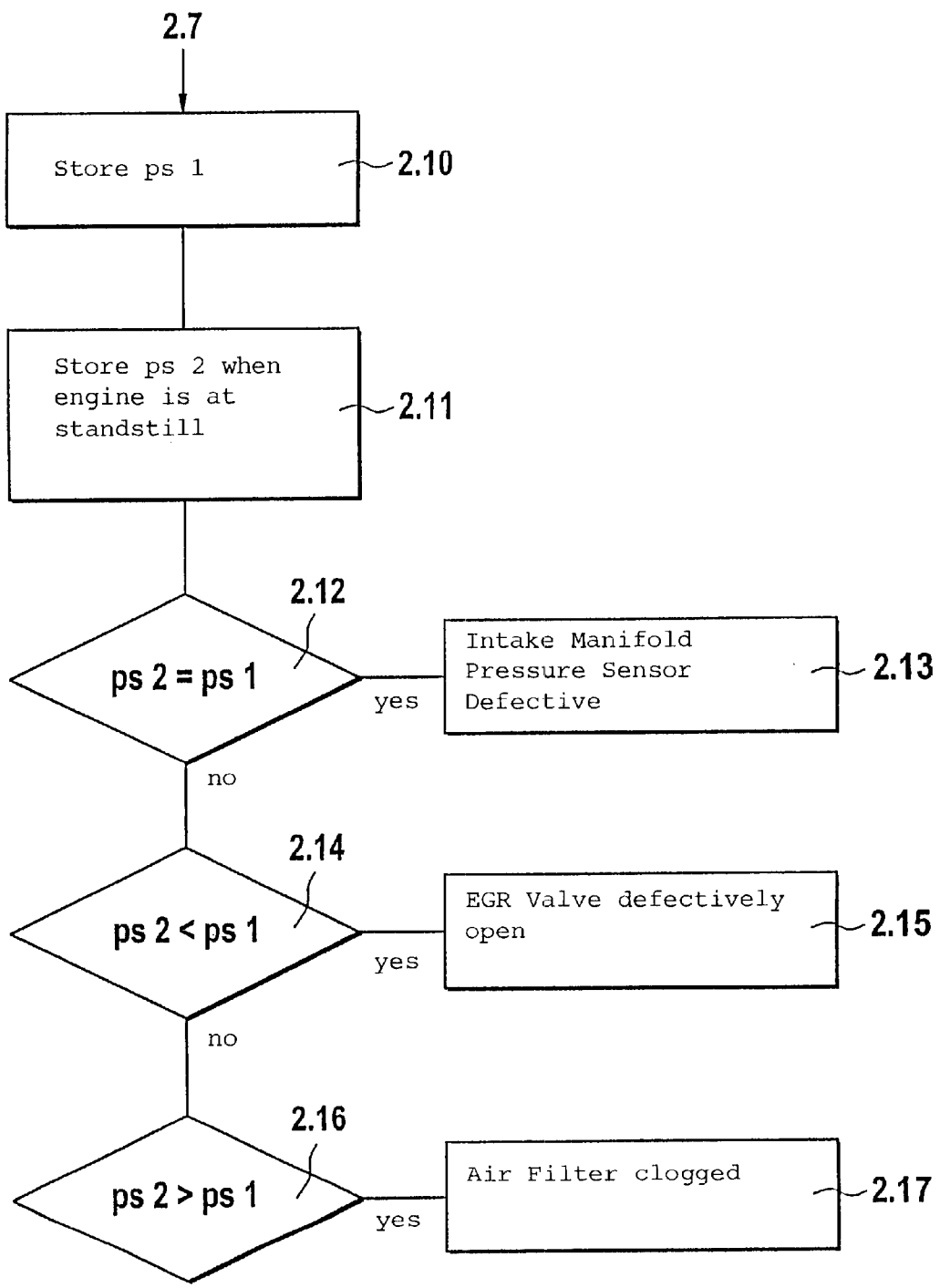
Figure 2C:
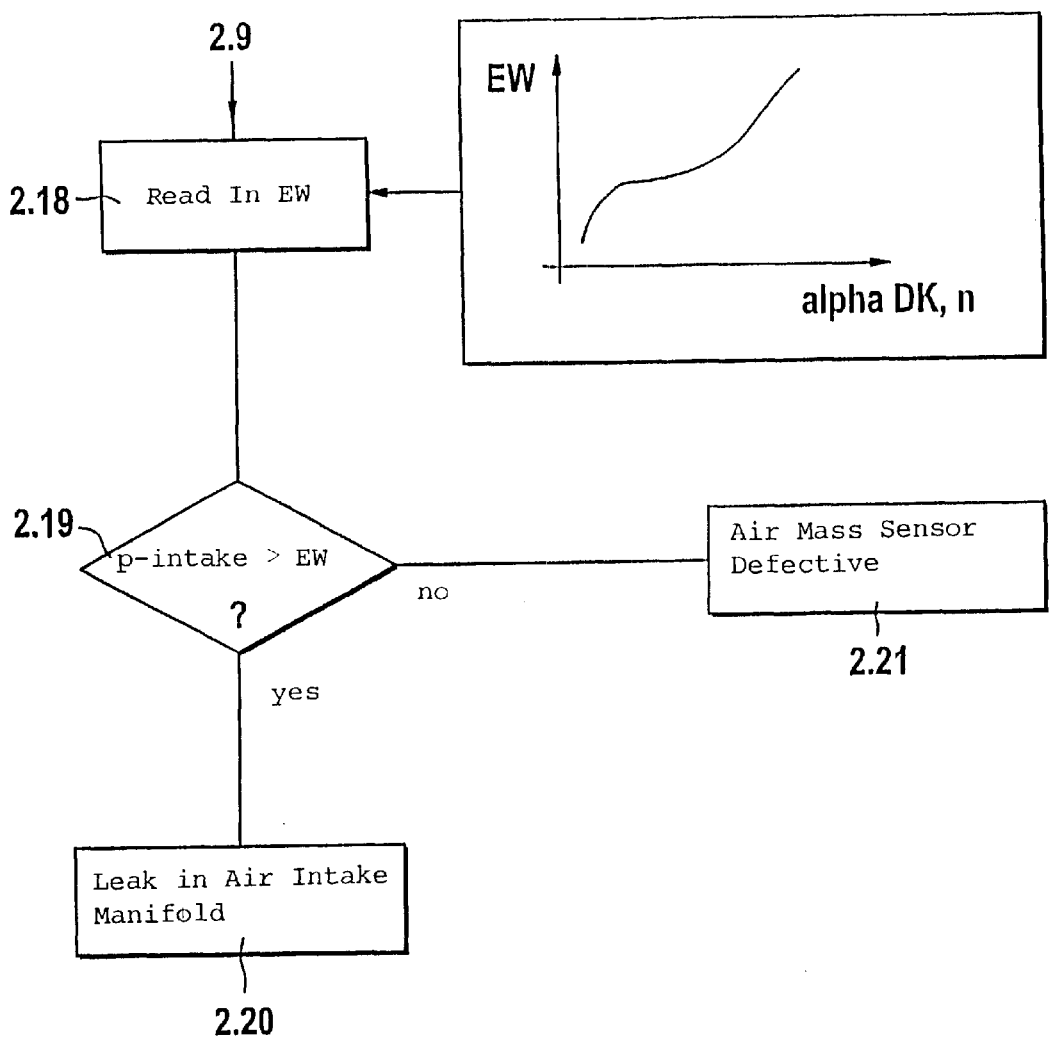

In a preferred embodiment of the invention as shown in FIGS. 2A to 2C, the following three load signals are formed: L1=rl–hfm, L2=rl–ps and L3=rl–rk (see step 2.1). The operating parameters, which are needed for the formation and are detected previously, are at least partially different: the signal of the air-mass sensor is not utilized for forming rl–ps or rl–rk. The signal of the intake manifold pressure sensor is not used for forming rl–hfm or rl–rk. The fuel mass is not utilized to form rl–hfm, rl–ps.

According to the invention, the three load signals are compared to each other in respective pairs in step 2.2. The pairs wherein deviations were determined are put together to form a combination in step 2.3. Different causes for the deviations are assigned to different combinations of deviations.

The following combinations can be distinguished.

Combination (1)

rl–hfm≠rl–ps and rl–hfm≠rl–rk and rl–ps≠rl–rk. In step 2.5, a defective tank-venting valve (TEV) is allocated as the cause of the deviations to this combination which is present in the affirmative in step 2.4.

rl–rk<rl–hfm flows through a defective venting valve. Because rl–ps>rl–hfm, rl–rk<rl–ps applies and therefore rl–rk≠rl–ps.

Combination (2)

The intake manifold pressure sensor or the exhaust-gas recirculation valve (EGR valve) is defective when rl–hfm≠rl–ps, rl–hfm=rl–rk, rl–ps≠rl–rk (see steps 2.6 and 2.7).

From the correspondence of rl–hfm and the air charge rl–rk, which is computed back from the fuel mass rk, the assumption can be made that the entire computation chain with the participating signals is OK.

A deviation of rl–ps can then be based on a defective intake manifold pressure sensor or an intake manifold pressure increased actually by inert gas.

A pressure increase caused by inert gas occurs typically when there is a defectively open exhaust-gas recirculation valve. This leads to a reduction of the intake air quantity which is, however, registered by the hot-film air-mass sensor. The portion of the fresh air in the gas charge of the cylinder changes as does the intake air quantity registered by the hot-film air-mass sensor so that the fuel metering, which is based on the hfm signal, follows the change of the air quantity. The inert gas portion of the cylinder charge, which inert gas portion is increased as a consequence of the defectively open exhaust-gas recirculation valve, therefore does not change the lambda value so that rl–rk and rl–hfm are coincident.

To distinguish a defectively open exhaust-gas recirculation valve from a defective manifold pressure sensor, the intake manifold pressure sensor signal is stored during the operation of the engine in step 2.10 (ps 1) (FIG. 2b). In the next standstill of the engine, the intake manifold pressure ps 2 is measured in the after-run of the control apparatus at rpm n=0 in step 2.11 and stored. Accordingly, ps 2 corresponds to the ambient pressure. When ps 2=ps 1 in step 2.12, then the intake manifold pressure sensor is deemed to be defective (see step 2.13). When ps 2 is less than ps 1, the exhaust-gas recirculation valve is defectively open (compare steps 2.14 and 2.15). When ps 2 is greater than ps 1, then the air filter is clogged and the question remains as to why. This is determined in steps 2.16 and 2.17.

Combination (3)

The air-mass measuring signal is disturbed when rl–hfm≠rl–ps, rl–hfm≠rl–rk, rl–ps=rl–rk (see steps 2.8 and 2.9). When the fuel mass rk is derived from a defective rl–hfm, the expected lambda value does not result. However, the correct value for rl–rk for the air mass can be computed from the measured lambda actual value and the fuel mass. Rl–rk will not be equal to the defective rl–hfm. The coincidence of rl–rk and rl–ps then leads to the conclusion as to a defective hfm signal as the cause of the deviations.

A defective hfm signal can be caused by a fault of the hot-film air-mass sensor or a fresh air leak in the intake manifold, that is, rearward of the hot-film air-mass sensor.

Both fault possibilities can be distinguished by an ancillary check (FIG. 2C). For this purpose, an expectation value or limit value EW of the intake manifold pressure is read in from a characteristic field (see step 2.18). A leak causes an intake manifold pressure which lies above an expectation value EW dependent upon throttle flap αDK (opening angle) and engine rpm (n). Accordingly, for a leak, the inquiry 2.19 is answered in the affirmative which leads to a leakage determination in step 2.20. Otherwise, in step 2.21, a defect of the air-mass sensor is determined. All determined faults can be stored in the control apparatus and/or be indicated to the driver via a fault lamp.

It is understood that the foregoing description is that of the preferred embodiments of the invention and that various changes and modifications may be made thereto without departing from the spirit and scope of the invention as defined in the appended claims.

What is claimed is:

1. A method of determining causes for faults in forming an air/fuel mixture for an internal combustion engine, the engine including an air intake manifold through which an air quantity is introduced into said engine during operation thereof; and, a control apparatus for determining an injection time based on operating parameters of said engine, the method comprising the steps of:

detecting different operating parameters of said engine;

forming at least first, second and third load signals, each representing the air quantity of said air/fuel mixture flowing into said engine, on the basis of at least some of said different operating parameters;

forming a plurality of different pairs of load signals with each pair containing two of said load signals;

determining deviations between the two load signals of each pair of the different pairs with respect to each other;

determining combinations of the pairs wherein deviations have occurred; and, attributing different causes to different combinations of pairs wherein deviations have been determined.

2. The method of claim 1, comprising the further step of detecting at least three of the following quantities as said operating parameters: a signal of an air-mass sensor, a signal of an rpm transducer, a signal of an intake manifold pressure sensor, a signal of an exhaust-gas probe, and a signal of a fuel pressure sensor.

3. The method of claim 2, wherein said first load signal is a first load signal (rl–hfm) formed on the basis of the signal of said air-mass sensor; said second load signal is a second load signal (rl–ps) formed on the basis of said intake manifold pressure sensor and said rpm transducer; and, said third load signal is a third load signal (rl–rk) formed on the basis of the injection time, the signal of said fuel pressure sensor and the signal of said exhaust-gas probe.

4. The method of claim 1, comprising the further steps of:

forming a first pair of load signals containing said first load signal and said second load signal; forming a second pair of load signals containing said first load signal and said third load signal; and, forming a third pair containing said second load signal and said third load signal.

5. The method of claim 4, comprising the further step of attributing a fault to a defective tank-venting valve when there are deviations in each pair of a combination of said first, second and third pairs.

6. The method of claim 4, comprising the further step of attributing a fault to a defective intake manifold sensor or a defective exhaust-gas valve or a clogged air filter when there are deviations in said first and third pairs of a combination of said first, second and third pairs.

7. The method of claim 4, comprising the further step of attributing a fault to a defective air-mass sensor or a leak in the intake manifold when there are deviations in said first and second pairs of a combination of said first, second and third pairs.

8. The method of claim 4, comprising the further step of attributing a fault to a defective fuel pressure sensor when there are deviations in said second and third pairs of a combination of said first, second and third pairs.

9. The method of claim 6, said air quantity in said air intake manifold being at an air intake manifold pressure during said operation of said engine and the method comprising the further steps of:

providing an air intake manifold pressure sensor for detecting said air intake manifold pressure;

storing a first value for the air intake manifold pressure during the operation of said engine;

detecting a second value for the air intake manifold pressure at standstill of said engine and comparing said second value to said first value;

if both said first and second values are the same, indicating said intake manifold pressure sensor as being defective;

if said second value exceeds said first value, indicating the air filter as being clogged; and, if said second value is less than said first value, indicating the exhaust-gas recirculating valve as being defective.

* * * * *